US006555003B2

(12) United States Patent
Ferro et al.

(10) Patent No.: US 6,555,003 B2
(45) Date of Patent: Apr. 29, 2003

(54) POTATO WASTEWATER TREATMENT METHOD

(75) Inventors: Larry S. Ferro, Pocatello, ID (US); Stephen C. O'Brien, Blackfoot, ID (US); Henry J. Camin, Pocatello, ID (US); Bruce M. Wright, Blackfoot, ID (US)

(73) Assignee: Basic American, Inc., San Francisco, CA (US)

( * ) Notice: Subject to any disclaimer, the term of this patent is extended or adjusted under 35 U.S.C. 154(b) by 17 days.

(21) Appl. No.: 09/765,967

(22) Filed: Jan. 19, 2001

(65) Prior Publication Data

US 2002/0096473 A1 Jul. 25, 2002

(51) Int. Cl.[7] .............................. C02F 1/00; C02F 1/44
(52) U.S. Cl. ...................................... 210/632; 210/641
(58) Field of Search .................................. 210/632, 641

(56) References Cited

U.S. PATENT DOCUMENTS

| | | | |
|---|---|---|---|
| 4,233,406 A | | 11/1980 | Wieg et al. |
| 5,250,182 A | * | 10/1993 | Bento et al. ................ 210/641 |
| 5,501,798 A | * | 3/1996 | Al-Samadi et al. ......... 210/638 |
| 5,573,795 A | | 11/1996 | Olsen |
| 5,707,524 A | * | 1/1998 | Potter ........................ 210/606 |
| 5,942,107 A | * | 8/1999 | Busch, Jr. ................ 210/195.2 |
| 6,195,825 B1 | * | 3/2001 | Jones ......................... 210/388 |

OTHER PUBLICATIONS

Meuser, F., "Possibilities for the Use of Ultrafiltration and the Reverse Osmosis for Extraction and Processing of Soluble Constituents from Process Water in Starch Industries," Staerke 28(8): 271–278 (1976) (English Abstract).

Eriksson and Sivik, "Ultrafiltration of potato process water—influence of processing variables," Potato Res. 19:279–287 (1976).

Meuser and Köhler, "Energy Saving by Membrane Filtration of Process Water of Potato and Wheat Starch Plants," Food Chemistry 10:1–13 (1983).

Leveau and Bouix, "Study of enzymatic and microbiological degradation of starch in order to purify a residual effluent," 5th International Fermentation Symposium, Ysee TSTA, Ecole Nat. Superieure des Ind. Agric & Alimentaries, Chaire de Microbiol. & des Ind. Microbiennes, Douai, France (1977).

Berne, S., "Wast Not, Want Not," Food Engineering p. 113–126 (Jun. 1998).

Mannapperuma et al., "Membrane Applications in a Potato Dehydrating Plant, A Report on the Membrane Application Trials Conducted by the Mobile Test Demonstration Unit (MTDU) at Basic American Foods, Blackfoot, During May–Jul. 1995," Electric Power Research Institute, Palo Alto, CA, Sep. 1995.

* cited by examiner

Primary Examiner—Chester T. Barry
(74) Attorney, Agent, or Firm—Dorsey & Whitney LLP; David J. Brezner

(57) ABSTRACT

A method for treating potato wastewater comprising the steps of pretreating a potato wastewater stream including suspended and dissolved solids with an alpha amylase enzyme to hydrolyze starch in the wastewater, ultra-filtering the enzyme-treated wastewater from step (a) to filter and remove a portion of the suspended solids in a first concentrate stream separated from the wastewater, and reverse osmosis-filtering the ultra-filtered wastewater from step (b) to remove at least about 70% of the wastewater dissolved and suspended solids in a second concentrate stream.

1 Claim, 1 Drawing Sheet

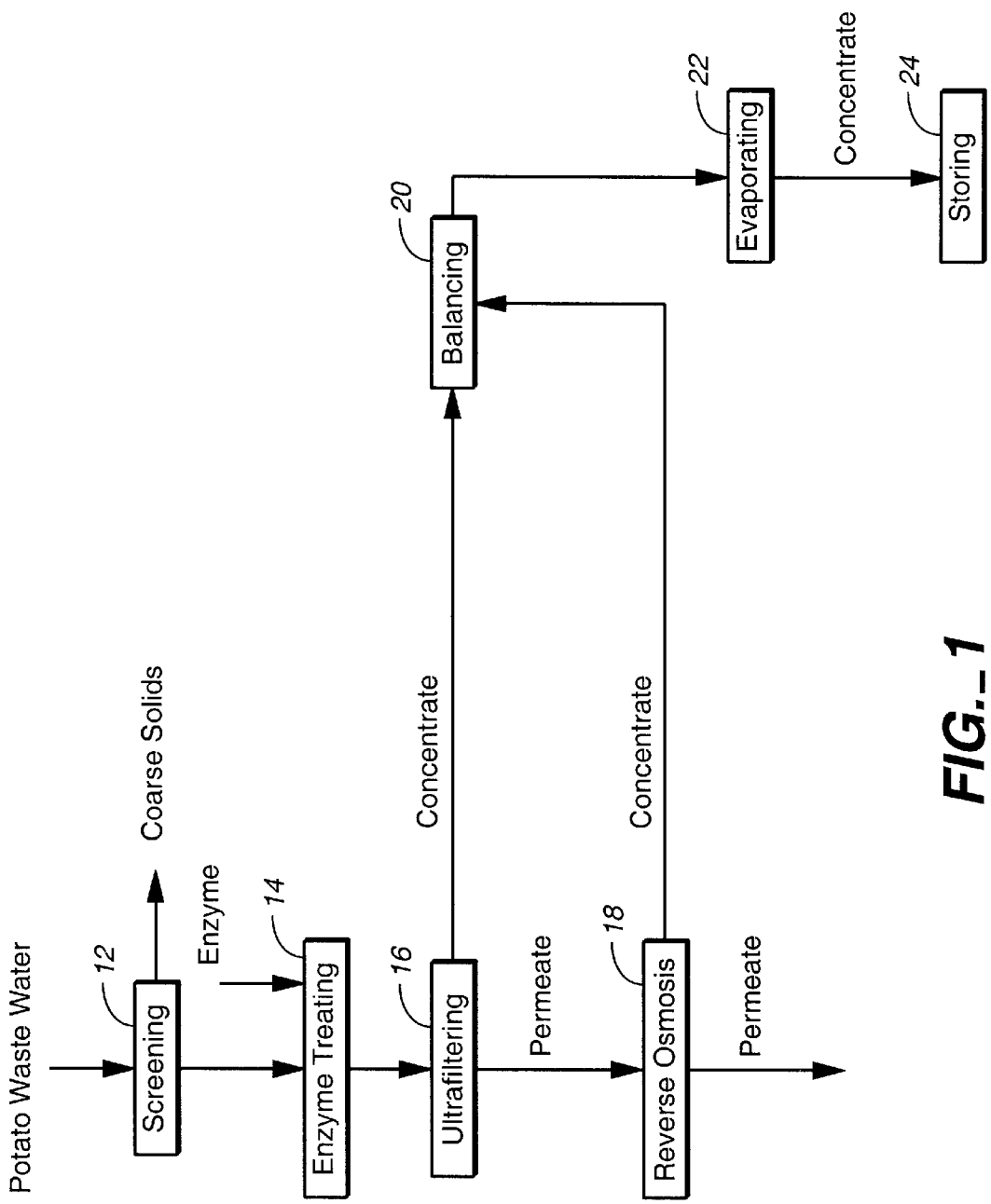
FIG._1

POTATO WASTEWATER TREATMENT METHOD

BACKGROUND OF THE INVENTION

In potato processing operations such as used in the dehydration of potatoes, water flows through various cookers, precookers and blanchers serving to minimize bacterial, taste and odor problems. The overflow or effluent water from such processing operations is called potato wastewater or potato water. Such potato wastewater is difficult to filter due to dissolved starch which tends to block screens in the filtration equipment. Various regulatory agencies are instituting stricter standards for the disposal of such wastewater. Accordingly, there is a need to reduce the potato solids in such wastewater, and to recover the solids as a usable byproduct.

SUMMARY OF THE INVENTION

It is an objective of the invention to provide a method for treating potato wastewater. The method comprises the following steps:
(a) pretreating a potato wastewater stream including suspended and dissolved solids with an alpha amylase enzyme to hydrolyze starch in the wastewater,
(b) ultra-filtering the enzyme-treated wastewater from step (a) to filter and remove a portion of the suspended solids in a first concentrate stream separated from the wastewater, and
(c) reverse osmosis-filtering the ultra-filtered wastewater from step (b) to remove at least about 70% of the wastewater dissolved and suspended solids in a second concentrate stream.

BRIEF DESCRIPTION OF THE DRAWING

FIG. 1 is a schematic drawing illustrating a method according to the present invention.

DETAILED DESCRIPTION OF THE PREFERRED EMBODIMENTS

In accordance with the present invention, a method is provided for treating potato wastewater which includes the steps of pretreating with an alpha amylase enzyme, ultra-filtering, reverse osmosis-filtering, and further concentrating the concentrate for disposal or sale. As used herein, the terms potato wastewater or potato water has the same meaning as used in the potato processing industry. In general, it includes the aqueous liquid effluent from unit operations in a potato processing plant (e.g., cookers, precookers and blanchers). For example, the potato wastewater can be the effluent from unit operations in the making of dehydrated potato products, e.g., potato flakes or potato granules. Typically, it is composed of dissolved and undissolved starch, sugar and small amounts of cellulose, protein, fat, and minerals. The wastewater typically contains about 0.5 to 2% by weight of total potato solids, about 0.1% of which is suspended solids. Depending on the plant operation, the wastewater to be treated is hot, generally at 150–190° F. with a pH of about 5.5 to 6.3.

Typically, the wastewater is first subjected to rough screening 12 to remove coarse solids. This is a conventional first screening step. In one mode of operation, the wastewater is directed to a filtration unit including two rotating screens, one inside the other to provide a rough filtration which removes the largest particle such as potato pieces, skins and the blemishes. Typically, the screens provide about 0.06 inch passages on the inner screen and 0.01 inch passages on the outer screen. Such equipment is typically kept clean by cleansing nozzles fixed about the rotating screens. This type of screening equipment is supplied by Lyco Manufacturing, Inc. under the name Double-Drum Screens. As part of the screening operation, the effluent pass can then be passed through to a hydrocyclone filter (e.g., 2 inch diameter) operated at 40 psig. The hydrocyclone separates sand and grit by centrifugal force to protect downstream equipment. Such hydrocyclone equipment is supplied by Lakos Separators under the name In-Line Separators.

In step 14, the potato wastewater is treated with one or more enzymes for a sufficient time to hydrolyze some of the starch in the wastewater stream. The conditions of enzyme treatment may be varied depending on the starch content of the wastewater. Sufficient enzyme should be used to reduce the viscosity of the wastewater stream so that it can flow readily through an ultrafiltration unit and, preferably, to permit concentration by evaporation of the concentrate stream at the end of the process to at least about 40% solids.

The potato wastewater is typically enzyme-treated under elevated temperatures because the wastewater stream to be treated is at elevated temperature (e.g., about 160° F.). Treatment temperatures may vary over a wide range, e.g., from 65° F. to about 230° F., preferably 160° F. to 190° F. and most preferably 175° F. to 185° F. The enzyme typically is added in the form of a solution. The enzymes should be selected to have good alpha amylase activity at the temperature and pH condition in the treatment system. Suitable alpha amylase enzymes for this purpose include Termamyl and BAN supplied by Novo Nordisk.

In one embodiment, the enzyme is added to one or more batch tanks, e.g. four 1,000 gallon tanks. Suitable enzyme concentrations in the treatment tanks typically range from about 0.03% to 0.12% based upon the potato solids. A preferred concentration from 0.05% to 0.09% and a more preferred concentration of about 0.07%. At a typical pH level for the potato wastewater (e.g., about 5.9), no pH adjustment is necessary to optimize the alpha amylase activity. If desired, enzyme treatment may be carried out in a continuous process.

In step 16, the enzyme-treated potato wastewater is ultra-filtered using one or more ultra-filtration ("UF") units to remove fine suspended solids in the potato wastewater forming a first concentration stream. The principles of UF are well known as disclosed, e.g. in *Ultrafiltration and Microfiltration* (M. Cheryan, Technomic Publishing Co., 1998), incorporated herein by reference.

The UF step is performed prior to the next unit operation, reverse osmosis ("RO"). UF treatment produces a permeate with lower suspended solids which can be subjected to RO with significantly less fouling than without the UF step.

In one preferred UF unit, the filter is constructed of stainless steel with a ceramic coating. This permits the unit to be repeatedly cleaned with a heated aggressive chemical such as nitric acid. Suitable ceramic coated stainless steel UF units are supplied under the name Scepter by Graver Technologies. Although other type of UF filters may be employed such as made of polyamide, these can be damaged by a hot chemical environment.

As used herein, the terms "ultra-filtration" or "UF" refer to a process which has been called ultrafiltration or microfiltration. The generally recognized differences in these terms is the pore size of the filter; ultrafiltration typically refers to a lower pore size (e.g., about 0.6–0.005 microns) while microfiltration typically refers to a higher pore size range (about 10–0.05 microns). Thus, the pore size for ultrafiltration as used herein broadly ranges from about 0.005–10 microns, preferably from 0.01 to 1.0 microns, more preferably from 0.05 to 0.5 microns and most preferably about 0.1 to 0.2 microns. The pore size is selected to be small enough to remove most of the suspended solids from the solution but allows the dissolved solids to pass.

Suitable operating parameters for the UF filters are at a pressure of about 5–35 psig inlet pressure and a temperature of about 110–205° F. More preferably, the filters are operated at 10–20 psig inlet pressure and a temperature of about 160–190° F. and most preferably about 175° F.

Typically, the UF is operated in a range of concentration ratios of about 10× to 20× and preferably about 15 (15×). The 15× term means that for every 15 volumes of liquid entering the units, one volume exits as a concentrate and 14 volumes as a permeate. For shorter durations, the UF can be operated up to about 40×. At higher ratios, the UF unit must be cleaned more frequently.

The concentrate stream from the ultra-filtration step 16 may be further concentrated, e.g., by evaporation. Alternatively it may be combined with the concentrate from the RO filtration step prior to evaporation.

In step 18, the permeate from the ultra-filtration step 16 is reverse osmosis (RO) filtered. The principles of RO are well known as disclosed, e.g. in Perry's Chemical Engineering Handbook, Sixth Edition, incorporated herein by reference. The RO unit serves as a further concentrator to remove water and save energy prior to the concentration step described below. The permeate water from the RO unit typically is free of the majority of COD and minerals which can be harmful to the aquifer. Some of the permeate can be used as cleaning water, and the balance may be discharged to a waste treatment system.

The RO units may be operated at low temperatures (e.g. ambient temperatures) or high (elevated) temperatures. If they are operated at high temperatures, the elements of the units may be modified to withstand the heat of the potato wastewater. In one embodiment, a stiff fiberglass wrap may be wrapped around the spiral wound shape to maintain their structural integrity. This plastic outer mesh wrap keeps water from bypassing or rushing past the elements. A commercially available RO element which can be so modified is of the high temperature type sold by Desal Osmonics.

As used herein, the terms "reverse osmosis" or "RO" refer to a process which has been called reverse osmosis or nano-filtering. The generally recognized differences in the latter terms is the molecular weight cut-off of the filters; reverse osmosis typically refers to a molecular weight cut-off of about 0–400 while nano-filtering typically refers to a molecular weight cut-off of about 180 to 10,000. As used herein, the terms "reverse osmosis" or "RO" refer to an upper cut-off of about 1,000 and a preferable upper cut-off of about 300.

In step 18, at least about 70% of the total solids content in the feed wastewater stream is removed in the concentrate, more preferably at least about 90%, and most preferably at least 95%–98% or more.

The concentration ratio can vary significantly in the RO unit due to the various conditions of the potato wastewater. Typical concentration ratios are about 2 to 8. Using these ratios, if the solids in the field stream are at 1.5% concentration, the concentrate solid exiting the ends can increase to about 3% to 18%.

Typical RO pressures at high temperatures are below about 300 psig, preferably less than about 250 psig, and more preferably less than about 200 psig. Typical RO pressures at low temperatures range from about 300 to 400 psig Other auxiliary concentration steps may also be used in the present invention. For example, an optional centrifuge or bag filter step may be added before or after UF and prior to RO. Suitable conditions for a centrifuge step are a G force of about 2,000 to 10,000, preferably about 4,000–6,000, e.g., in a vertical stacked disk centrifuge of the type sold by Westphalia, Inc.

In step 20, the concentrate from the UF unit and the RO unit can be combined in any desired ratio balancing step 20 prior to further concentration. Alternatively, the concentrate can be comprised of all of one stream or the other.

In step 22, the combined concentrate from step 20 is further concentrated, preferably by evaporation. The concentrate stream from step 20 is typically between 1.5 and 10% solids, preferably is at least about 3% solids, and more preferably is at least about 5% solids.

In step 22, one suitable type of evaporator is a rising film evaporator that employs a plate pack, similar to a plate heat exchanger. Such an evaporator can have three effects, the first one operating between 155° F. and 200° F., optimally at about 165° F.; the second one operating between 130° F. and 180° F., optimally at 135° F.; and the final one operating between about 105° F. and 130° F., optimally at about 110° F. A suitable evaporator of this type is supplied by API Schmidt-Bretten under the name Sigma Star.

The final concentrate of the evaporator typically includes as high as 20–40% solids, more preferable at least about 30–40% solids and may be as high as 50–60% solids or more.

The final concentrate after evaporation has potential commercial value and can be stored in step 24 for uses such as a feed to an ethanol plant or animal feed. For long term storage, it may be mixed with a preservative such as about 500 ppm sulphite or held at an elevated temperature (e.g., at least 140° F.).

Typical operating temperatures throughout the wastewater treatment are between about 150° F. and 185° F., more preferably at least about 160° F. to 175° F., and more preferably at least about 173° F. Use of such high temperatures minimizes bacterial (thermophile) growth.

In order to illustrate the nature of the present invention, an example of its practice is provided.

EXAMPLE 1

Potato water at a rate of 100 gpm enters a Lyco Drum screener. The screener removes large chunks, skins and other macro size potato pieces from this incoming liquid. The temperature of this stream is about 170° F. After screening, the liquid is pumped through a Lakos Brand centrifugal separator to remove sand and silt. The pressure varies between 30 and 50 psig. A small amount (less than 0.1–0.3 gpm) of process liquor is exhausted from the separator during this step to flush away the grit.

After this initial screening and centrifugal separation, the liquid now contains approximately 1.5% total solids and about 0.1% of that total is suspended solids. The temperature has decreased to about 160° F. In order to prepare the potato water for enzyme processing, the temperature is raised to 178° F. using direct steam injection (a heat exchanger can also be used). The hot liquid is metered into one of four 1,000 gallon enzyme holding tanks. About 40 milliliters of Termamyl 120 L alpha amylase enzyme is added and the liquid is allowed to hold and agitate for about 30 minutes.

The potato process water is then ultra-filtered using Graver Stainless Steel Ultra-filtration elements. The unit operates at 20 psig feed pressure and 173° F. A volume concentration ratio of 15 is preferred for this process thus 100 gpm is concentrated to 7 gpm. This concentrate stream contains suspended solids as well as dissolved solids. The total solids for this stream would be 2.9% [(0.1%×15)+1.4%=2.9%]. The permeate from this operation is generally clear with a pale yellowish color. The flow rate of the permeate stream is 93 gpm.

The permeate from the ultra-filter is further filtered using a food grade reverse osmosis system constructed by Niro, Inc. The filter concentrates the liquid from 93 gpm to 18 gpm. This is 5.16 concentration ratio therefore the solids increase from 1.4% to 7.2%. This unit is ideally operated at less than 200 psig and 173° F. The filter elements in this example were of the high temperature type with a fiberglass outer wrap for added structural integrity. They were constructed by PTI-AMT, Inc. The permeate from this stream is clear, contains little COD loading and can re-enter a waste treatment system or be used as cleaning water.

The concentrate from the reverse osmosis unit is combined with the concentrate from the ultra-filtration unit and fed into an evaporator for further concentration. Seven gallons per minute from the UF combines with 18 gpm from the RO to provide a 25 gpm evaporator feed stream at 170° F. with solids of about 6%.

The above combined stream is concentrated further using a triple effect rising film evaporator, triple effect (Sigma Star, API Schmidt-Bretten). The liquid exits this process with a total solids content between 30 and 40%.

What is claimed is:

1. A method for treating potato wastewater comprising the steps of
    (a) pretreating a potato wastewater stream including suspended and dissolved solids with an alpha amylase enzyme to hydrolyze starch in the wastewater,
    (b) ultra-filtering the enzyme-treated wastewater from step (a) to filter and remove a portion of the suspended solids in a first concentrate stream separated from the wastewater,
    (c) reverse osmosis-filtering the ultra-filtered wastewater from step (b) to remove at least about 70% of the wastewater dissolved and suspended solids in a second concentrate stream, and
    (d) further concentrating the second concentrate stream by evaporation.

* * * * *